(12) United States Patent
Macerini

(10) Patent No.: US 11,012,030 B2
(45) Date of Patent: May 18, 2021

(54) SHUT-DOWN APPARATUS FOR A STRING OF PHOTOVOLTAIC PANELS

(71) Applicant: ABB Schweiz AG, Baden (CH)

(72) Inventor: Sauro Macerini, Bucine (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/352,239

(22) Filed: Mar. 13, 2019

(65) Prior Publication Data
US 2019/0288641 A1    Sep. 19, 2019

(30) Foreign Application Priority Data

Mar. 13, 2018 (EP) ..................................... 18161376

(51) Int. Cl.
  *H02S 40/32* (2014.01)
  *H02S 50/00* (2014.01)
  *H02S 40/34* (2014.01)
  *H02J 3/38* (2006.01)
  *H02M 1/36* (2007.01)

(52) U.S. Cl.
  CPC .............. *H02S 40/32* (2014.12); *H02J 3/383* (2013.01); *H02M 1/36* (2013.01); *H02S 40/34* (2014.12); *H02S 50/00* (2013.01)

(58) Field of Classification Search
  CPC .......... H02S 40/32; H02S 40/34; H02S 50/00; H02S 40/36; H02J 3/383; H02M 1/36
  USPC ....................................................... 340/4.34
  See application file for complete search history.

(56) References Cited

U.S. PATENT DOCUMENTS

| | | | | |
|---|---|---|---|---|
| 4,352,201 A | * | 9/1982 | Miller | H04L 12/417 178/2 D |
| 2009/0141522 A1 | * | 6/2009 | Adest | H04B 3/548 363/55 |
| 2010/0132758 A1 | * | 6/2010 | Gilmore | H01L 31/02021 136/244 |
| 2010/0139734 A1 | * | 6/2010 | Hadar | H01L 31/052 136/244 |

(Continued)

FOREIGN PATENT DOCUMENTS

WO    2010078305 A1    7/2010

OTHER PUBLICATIONS

European Patent Office, Extended Search Report issued in corresponding Application No. 18161376.1, dated Jun. 11, 2018, 6 pp.

(Continued)

*Primary Examiner* — Edwin C Holloway, III
(74) *Attorney, Agent, or Firm* — Taft Stettinius & Hollister LLP

(57) ABSTRACT

A shut-down apparatus for a string of photovoltaic panels electrically connected in series wherein it comprises a plurality of control modules comprising: an initial control module operatively associated to a corresponding photovoltaic panel; one or more intermediate control modules, each operatively associated to a corresponding photovoltaic panel; a final control module operatively associated to a corresponding photovoltaic panel. Each control module is adapted to cause the shut-down of a corresponding photovoltaic panel in response to a received input shut-down signal, said control modules sequentially receiving said input shut-down signals at subsequent shut-down instants, each pair of subsequent shut-down instants being separated by a corresponding time delay.

20 Claims, 8 Drawing Sheets

(56) References Cited

U.S. PATENT DOCUMENTS

| | | | | |
|---|---|---|---|---|
| 2010/0308662 A1* | 12/2010 | Schatz | H02J 13/0003 | 307/80 |
| 2011/0172842 A1* | 7/2011 | Makhota | H02M 7/44 | 700/292 |
| 2011/0173276 A1* | 7/2011 | Eizips | H02J 3/385 | 709/206 |
| 2012/0049637 A1* | 3/2012 | Teichmann | H02J 3/383 | 307/82 |
| 2015/0107646 A1 | 4/2015 | Fife et al. | | |
| 2015/0171789 A1 | 6/2015 | Har-Shai et al. | | |
| 2016/0126367 A1* | 5/2016 | Dunton | H02S 40/32 | 307/115 |
| 2016/0164457 A1* | 6/2016 | Robbins | H02S 40/34 | 307/80 |
| 2017/0288408 A1* | 10/2017 | Kim, II | H02S 40/32 | |
| 2018/0062392 A1* | 3/2018 | Urabe | H01L 31/0504 | |

OTHER PUBLICATIONS

European Patent Office, Office Action issued in corresponding Application 18161376.1, dated Jun. 16, 2020, 4 pp.

\* cited by examiner

SHUT-DOWN APPARATUS FOR A STRING OF PHOTOVOLTAIC PANELS

The present invention relates to the field of photovoltaic plants for electric power generation. More particularly, the present invention relates a shut-down apparatus for controlling a shut-down operation of a string of photovoltaic panels electrically connected in series one with another.

As is known, a photovoltaic plant generally includes a DC section, an inverter section and an AC section.

The DC section includes one or more strings of photovoltaic panels, each formed by a plurality of photovoltaic panels electrically connected in series, and a DC bus electrically connecting in parallel such strings of photovoltaic panels with a DC side of the inverter section.

The AC section includes an AC bus electrically connecting an AC side of the inverter section with an AC grid, e.g. an electric power distribution grid, and other devices for managing the transmission of AC electric power provided by the inverter section.

The inverter section includes a main DC/AC switching converter and other devices for managing the DC/AC conversion of DC electric power provided by the photovoltaic panels.

As is known, in some countries (e.g. in the USA), there are technical regulations requiring photovoltaic plants to be equipped with protection arrangements (also known as shut-down apparatuses) capable of de-energizing the DC section (in particular the photovoltaic panels) of a photovoltaic plant in case of need, e.g. upon a manual intervention of an operator or in case of failure of the AC grid.

In order to obtain the shut-down of the DC section of the photovoltaic plant, a traditional shut-down apparatus normally intervenes at string level by short-circuiting the power terminals of each string of photo-voltaic panels.

A relevant drawback of this solution consists in the onset of high in-rush currents when the power terminals of a string of photo-voltaic panels are short-circuited. Such in-rush currents are due to the sudden discharge of capacitances present in the system, namely the parasitic capacitances of the photovoltaic panels and the input capacitance at the DC side of the inverter electrically connected in parallel with such string of photovoltaic panels. In particular, the input capacitance at the DC side of the inverter takes a predominant role in generating said in-rush currents, as it may have high values, e.g. from tens up to thousands μF.

Another drawback of this solution resides in that, notwithstanding the intervention of the shut-down apparatus, some photovoltaic panels may not be de-energized if interruptions in the electrical connection between the photovoltaic panels are present for some reasons (e.g. due to a fault). As it is easy to understand, such a circumstance may give rise to relevant safety issues for an operator intervening on the photovoltaic plant.

The main aim of the present invention is to provide a shut-down apparatus for a string of photovoltaic panels, which allows overcoming the disadvantages described above.

Within this aim, another object of the present invention is to provide a shut-down apparatus, which allows limiting the presence of in-rush currents during the de-energization of the string of photovoltaic panels.

Another object of the present invention is to provide a shut-down apparatus, which allows obtaining a full de-energization of the string of photovoltaic panels even if interruptions in the electrical connection between the photovoltaic panels are present for some reasons.

Another object of the present invention is to provide a shut-down apparatus easy and inexpensive to produce at industrial level and install on the field.

This aim and these objects, together with other objects that will be more apparent from the subsequent description and from the accompanying drawings, are achieved, according to the invention, by a shut-down apparatus.

BRIEF SUMMARY OF THE INVENTION

In a general definition, the shut-down apparatus, according to the invention, comprises a plurality of control modules including an initial control module, one or more intermediate control modules and a final control module operatively associated to a corresponding photovoltaic panel. Each control module is adapted to cause the shut-down of a corresponding photovoltaic panel in response to a received input shut-down signal. Said control modules are adapted to sequentially receive said input shut-down signals at subsequent shut-down instants. Each pair of subsequent shut-down instants is separated by a corresponding time delay.

According to an embodiment of the invention, said control modules are operatively coupled in series one with another, according to a daisy chain configuration.

According to such an embodiment of the invention, said initial control module is in communication with a control arrangement and with a subsequent control module and is adapted to cause, in response to an input shut-down signal received from said control arrangement, the shut-down of a corresponding photovoltaic panel and to provide an output shut-down signal for said subsequent control module, said output shut-down signal having a time delay with respect to the received input shut-down signal.

According to such an embodiment of the invention, each intermediate control module is in communication with a preceding control module and with a subsequent control module and is adapted to cause, in response to an input shut-down signal received from said preceding control module, the shut-down of a corresponding photovoltaic panel and to provide an output shut-down signal for said subsequent control module, said output shut-down signal having a time delay with respect to the received input shut-down signal.

According to such an embodiment of the invention, said final control module is in communication with a preceding control module and is adapted to cause, in response to an input shut-down signal received from said preceding control module, the shut-down of a corresponding photovoltaic panel.

According to an alternative embodiment of the invention, said control modules are operatively coupled in parallel with an external control arrangement.

According to such an embodiment of the invention, said initial control module is in communication with said control arrangement and is adapted to cause, in response to an input shut-down signal received from said control arrangement, the shut-down of a corresponding photovoltaic panel.

According to such an embodiment of the invention, each of said one or more intermediate control modules is in communication with said control arrangement and is adapted to cause, in response to an input shut-down signal received from said control arrangement, the shut-down of a corresponding photovoltaic panel.

According to such an embodiment of the invention, said final control module is in communication with said control arrangement and is adapted to cause, in response to an input shut-down signal received from said control arrangement, the shut-down of a corresponding photovoltaic panel;

According to such an embodiment of the invention, said control modules are adapted to sequentially receive said input shut-down signals from said control arrangement at subsequent shut-down instants separated by corresponding time delays.

According to an aspect of the invention, each control module comprises a controller and a switching circuit controlled by said controller and electrically coupled in parallel with power terminals of a corresponding photovoltaic panel. Said switching circuit is adapted to short-circuit the power terminals of said corresponding photovoltaic panel in response to a trip signal received from said controller.

Preferably, said switching circuit comprises a switch and an impedance electrically connected in series with said switch. Conveniently, said switching circuit is electrically connected in parallel with the power terminals of said corresponding photovoltaic panel. Said controller is adapted to provide said trip signal in response to a received input shut-down signal.

According to further aspects, the present invention relates to a control system and to a photovoltaic plant.

BRIEF DESCRIPTION OF SEVERAL VIEWS OF THE DRAWINGS

Further characteristics and advantages of the present invention will be more apparent with reference to the description given below and the accompanying figures, provided purely for explanatory and non-limiting purposes, wherein.

DETAILED DESCRIPTION OF THE INVENTION

With reference to the aforesaid figures, the present invention relates to a shut-down apparatus 1 for a string 100 of photovoltaic panels in a low voltage photovoltaic plant 500 for electric power generation.

For the sake of clarity, it is specified that the term "low voltage" refers to operating voltages lower than 1 kV AC and 1.5 kV DC.

Figure 1:
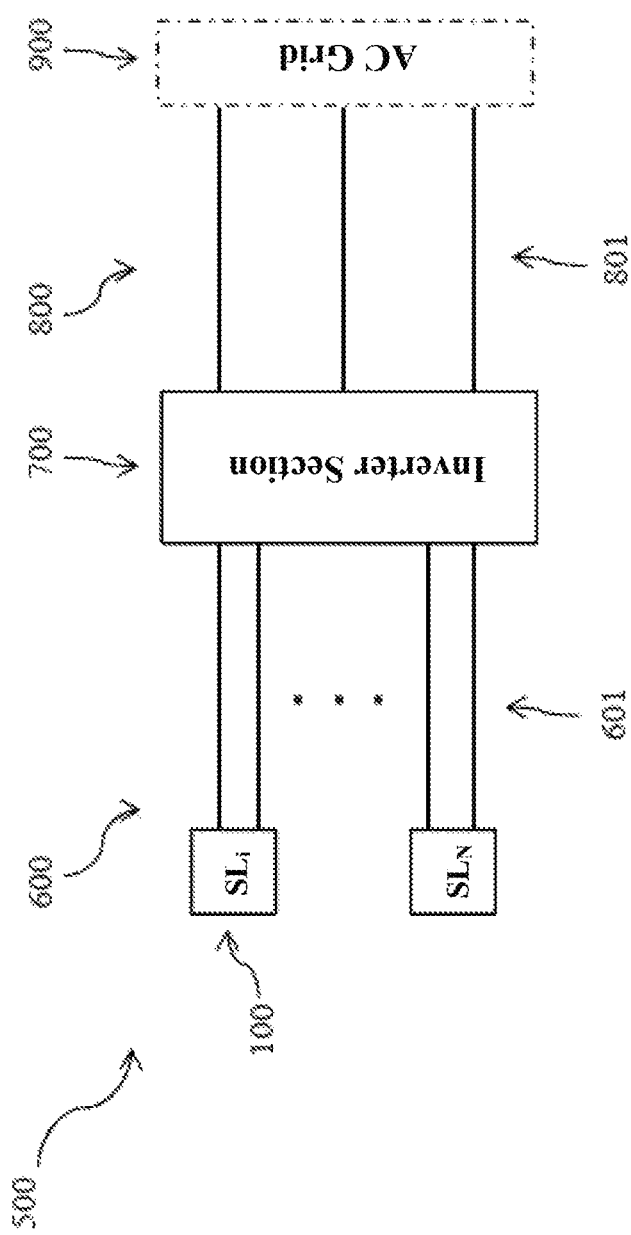
FIG. 1 schematically illustrate a photovoltaic plant.

Referring to FIG. 1, the photovoltaic plant 500 comprises a DC section 600 including one or more strings 100 of photovoltaic panels and at least a DC electric bus 601 electrically connected with said strings of photovoltaic panels.

The photovoltaic plant 500 further comprises an inverter section 700 (IS) including a DC/AC main switching converter electrically connected with the DC electric bus 601 and other devices to manage the DC/AC conversion of DC electric power provided by the photovoltaic panels.

The photovoltaic plant 500 additionally comprises an AC section 800, which includes an AC electric bus 801 electrically connected with the inverter section 700 and other devices (not shown) to manage the downstream transmission of AC electric power provided by the inverter section 700. The AC electric bus 801 may be electrically connected with an AC grid 900, e.g. an electric power distribution grid fed by the photovoltaic plant 500.

Most of the components of the DC section 600, the inverter section 700 and the AC section 800 of the photovoltaic plant 500 may be of known type and will not be further described in further details for the sake of brevity.

Figure 2:
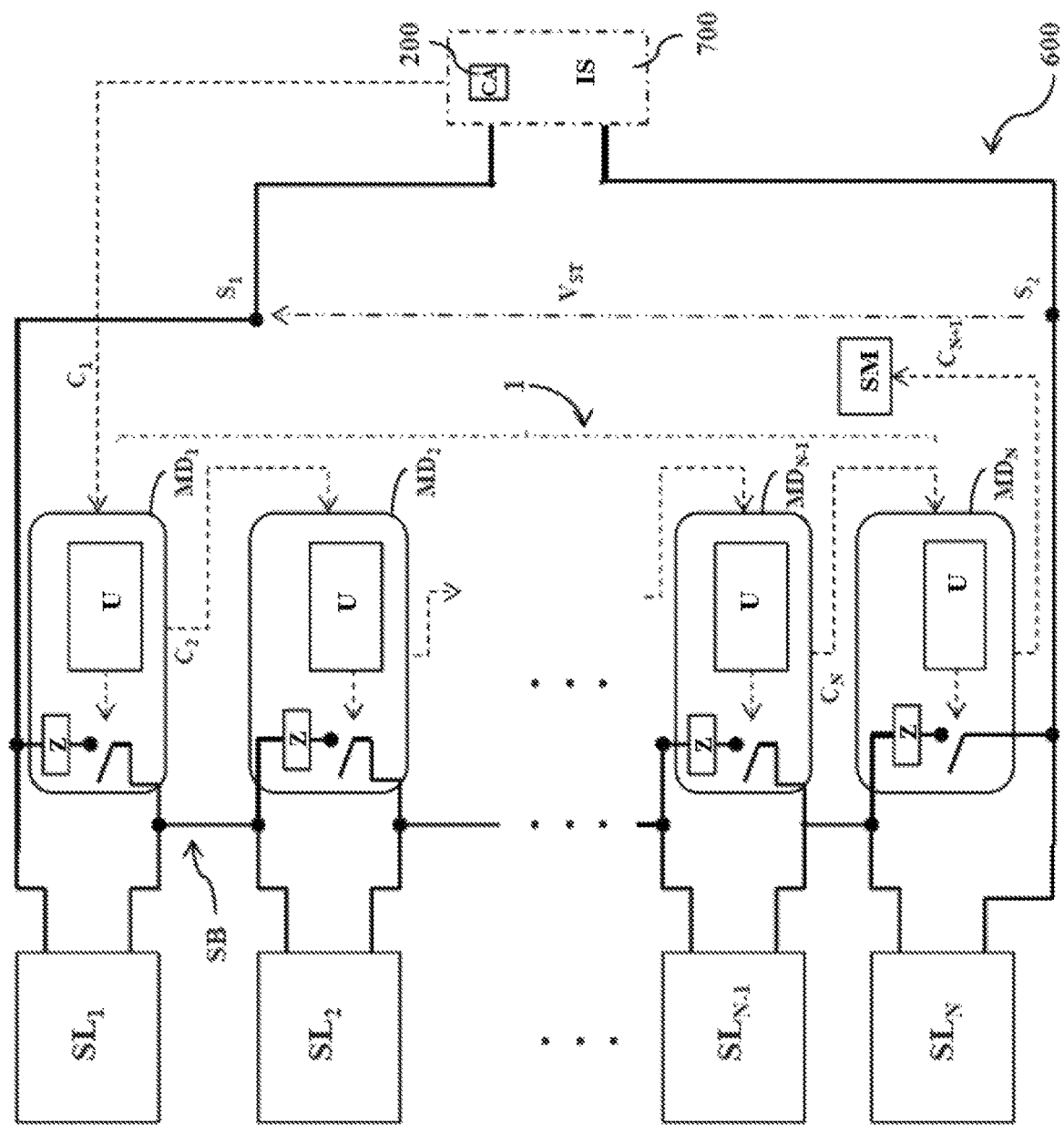
FIGS. 2, 2A schematically illustrate alternative embodiments of the shut-down apparatus, according to the present invention.
Figure 2A:
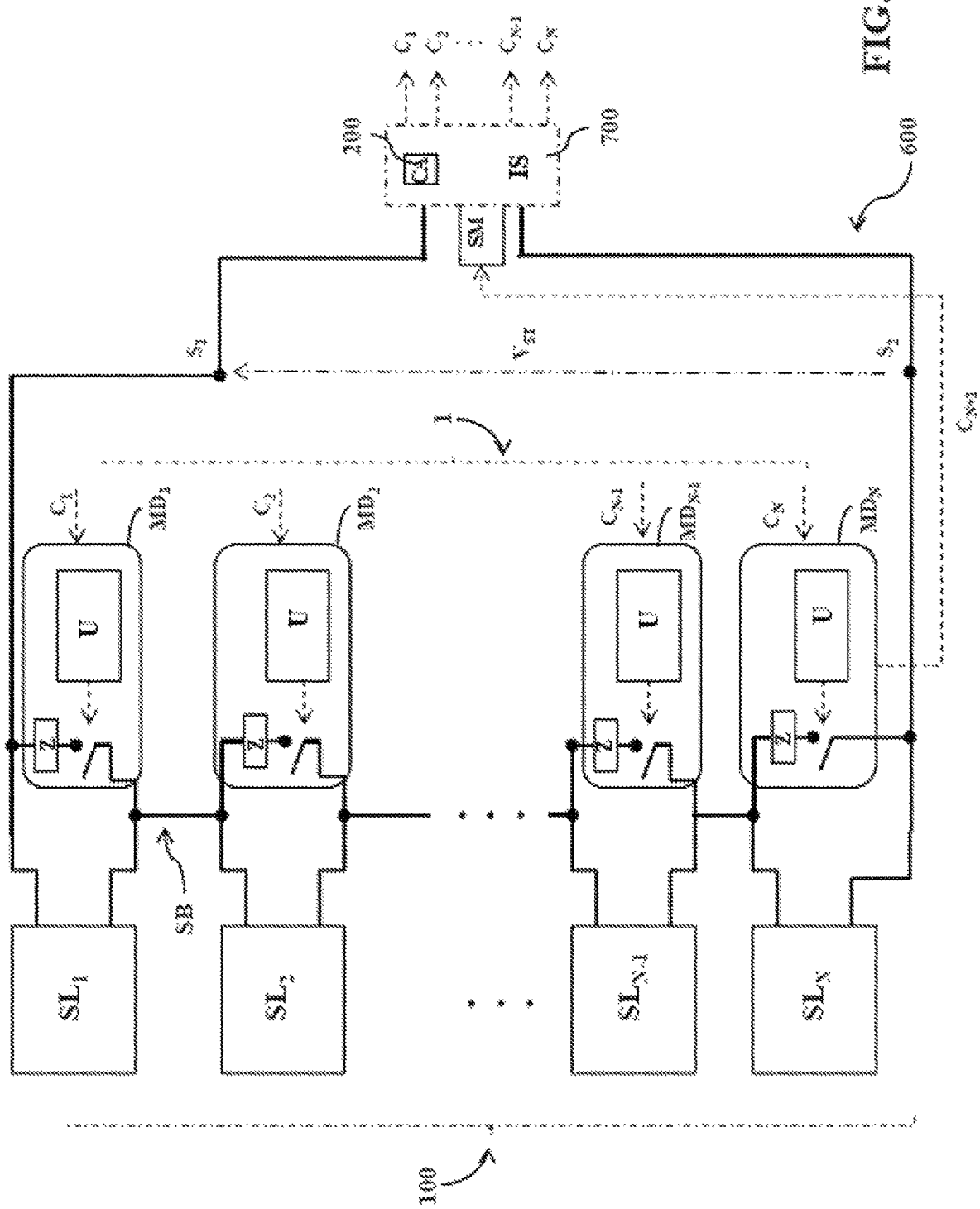

Referring to FIGS. 2, 2A, a string 100 of photovoltaic panels comprises a plurality of photovoltaic panels $SL_1$, $SL_2$, $SL_{N-1}$, $SL_N$ electrically connected in series one to another by an electric power bus SB. Obviously, the number N of photovoltaic panels electrically connected in series basically depends on the installation requirements of the photovoltaic plant 500.

Most of the components of the photovoltaic string 100, for example the electric power bus SB and the photovoltaic panels $S_{Li}$ (i=1, ..., N), may be of known type and will not be further described in further details for the sake of brevity.

According to the invention, the shut-down apparatus 1 comprises a plurality of control modules $MD_i$ (i=1, ..., N), more particularly an initial control module $MD_1$, one or more intermediate modules $MD_i$ (i=2, ..., N-1) and a final control module $MD_N$.

Each control module $MD_i$ (i=1, ..., N) is operatively associated with a corresponding photovoltaic panel $S_{Li}$ (i=1, ..., N). Namely, the initial control module $MD_1$ is operatively associated to a corresponding initial photovoltaic panel $SL_1$, each intermediate control module $MD_i$ (i=2, ..., N-1) is operatively associated to a corresponding intermediate photovoltaic panel $SL_i$ (i=2, ..., N-1) and the final control module $MD_N$ is operatively associated to a corresponding final photovoltaic panel $SL_N$.

Each control module $MD_i$ (i=1, ..., N) is adapted to cause the shut-down of its corresponding photovoltaic panel $S_{Li}$ (i=1, ..., N) in response to a received input shut-down signal Ci, (i=1, ..., N).

According to the invention, the control modules $MD_1$, ..., $MD_N$ sequentially receive the input shut-down signals $C_1$, ..., $C_N$ at subsequent shut-down instants with each pair of subsequent shut-down instants separated by a corresponding time delay $T_d$.

In general, each control module $MD_i$ (i=1, ..., N) is provided with communication capabilities, e.g. for communication with other control modules and/or other electronic devices.

The communication between the control modules and/or with another electronic device may be conveniently realized through wired or wireless communication means of known type.

Conveniently, the shut-down apparatus 1 comprises or is operatively associated with a control arrangement 200 (CA) adapted to command the shut-down of the string 100 of photovoltaic panels for any reasons, e.g. due to a manual intervention of an operator or due to a fault.

Preferably, the control arrangement 200 is a controller included in the inverter section 700 (as shown in FIG. 2) or in the DC section 600 of the photovoltaic plant. Such a controller is conveniently activatable by the manual intervention of an operator or upon receiving a suitable control signal provided by a further control unit (e.g. a control unit of the AC/DC main switching inverter).

As an alternative, the control arrangement 200 may be a control unit of the DC/AC main switching converter itself or any other control unit remote positioned with respect to the photovoltaic plant. As a further alternative, the control arrangement 200 may be a dedicated control unit included in the shut-down apparatus 1.

According to an embodiment of the invention (FIG. 2), the control modules $MD_i$ (i=1, ..., N) are operatively connected in series to form a chain of control modules having a daisy chain configuration.

According to this embodiment of the invention, the initial control module $MD_1$ is in communication with the control arrangement 200 and a subsequent control module $MD_2$, each intermediate control module $MD_i$ (i=2, ..., N−1) is in communication with a preceding control module $MD_{i−1}$ (i=2, ..., N−1) and a subsequent control module $MD_{i+1}$ (i=2, ..., N−1) and the final control module $MD_N$ is in communication with a preceding control module $MD_{N−1}$.

The initial control module $MD_1$ is adapted to cause the shut-down of the corresponding photovoltaic panel $SL_1$ in response to an input shut-down signal $C_1$ received from the control arrangement 200.

The initial control module $MD_1$ is adapted to provide an output shut-down signal $C_2$ for a subsequent control module $MD_2$ in response to the received input shut-down signal $C_1$. The output shut-down signal $C_2$ is provided by the initial control module $MD_1$ with a corresponding time delay $T_d$ with respect to the received input shut-down signal $C_1$.

Each intermediate control module $MD_i$ (i=2, ..., N−1) is adapted to cause the shut-down of the corresponding photovoltaic panel $SL_i$ (i=2, ..., N−1) in response to an input shut-down signal $C_i$ (i=2, ..., N−1) received from a preceding control module $MD_{i−1}$ (i=2, ..., N−1). Each intermediate control module $MD_i$ is adapted to provide an output shut-down signal $C_i$ (i=2, ..., N−1) for a subsequent control module $MD_{i−1}$ (i=2, ..., N−1), in response to the input shut-down signal $C_i$. The output shut-down signal $C_{i+1}$ is provided by each intermediate control module $MD_i$ with a corresponding time delay $T_d$ with respect to the received input shut-down signal $C_i$. The final control module $MD_N$ is adapted to cause the shut-down of the corresponding photovoltaic panel $SL_N$ in response to an input shut-down signal $C_N$ received from a preceding control module $MD_{N−1}$.

According to another embodiment of the invention (FIG. 2A), the control modules $MD_i$ (i=1, ..., N) are arranged with a parallel configuration and are capable of communicating in parallel with the control arrangement 200.

The initial control module $MD_1$ is adapted to cause the shut-down of the corresponding photovoltaic panel $SL_1$ in response to an input shut-down signal $C_1$ received from the control arrangement 200.

Each intermediate control module $MD_i$ (i=2, ..., N−1) is adapted to cause the shut-down of the corresponding photovoltaic panel $SL_i$ (i=2, ..., N−1) in response to an input shut-down signal $C_i$ (i=2, ..., N−1) received from the control arrangement 200.

The final control module $MD_N$ is adapted to cause the shut-down of the corresponding photovoltaic panel $SL_N$ in response to an input shut-down signal $C_N$ received from the control arrangement 200. The control modules $MD_i$ (i=1, ..., N) are adapted to sequentially receive the input shut-down signals $C_i$ (i=1, ..., N) from the control arrangement 200 at subsequent shut-down instants separated by corresponding time delays $T_d$.

It is noted that, according to this embodiment of the invention, the control modules $MD_i$ (i=1, ..., N) do not necessarily need to communicate one with another as in the previous embodiment of FIG. 2.

According to an aspect of the invention (FIGS. 2, 2A), the final control module $MD_N$ is adapted to provide an output control signal $C_{N+1}$ in response to the received input shut-down signal $C_N$, which is provided by a preceding control module $MD_{N−1}$, according to the embodiment of FIG. 2, or by the control arrangement 200, according to the embodiment of FIG. 2A.

Preferably, the output control signal $C_{N+1}$ is provided by the final control module $MD_N$ with a corresponding time delay $T_d$ with respect to the received input shut-down signal $C_N$.

Preferably, the final control module $MD_N$ is in communication with a signalling module SM and is adapted to provide the output control signal $C_{N+1}$ to suitably drive said signalling module.

Preferably, the signalling module SM is adapted to provide user interface signals (e.g. visual signals) indicative of the operating status of the string 100 of photovoltaic panels in response to the received control signal $C_N$.

The signalling module SM (which may be of known type) may be included in the shut-down apparatus 1 or may be a device external to this latter (e.g. included in the inverter section 700) or even be included in the control arrangement 200.

Figure 3:
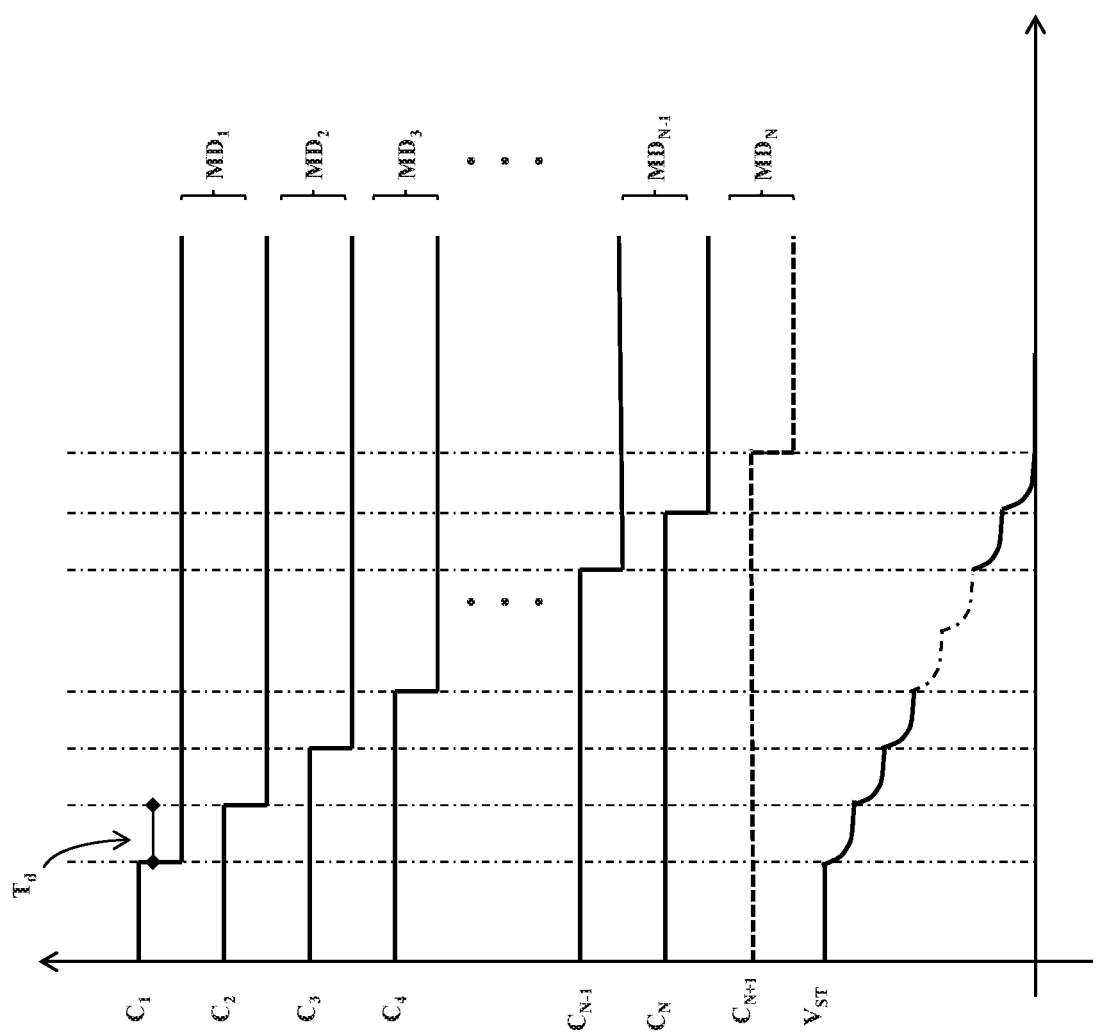
FIGS. 3-7 schematically illustrate further relevant aspects of the shut-down apparatus, according to the present invention.

Preferably, as shown in FIG. 3, in both embodiments of FIGS. 2 and 2A, the shut-down signals (i=1, ..., N) and the output control signal $C_{N+1}$ are logic signals varying their logic state to provide a shut-down command or a control command.

Figure 4:
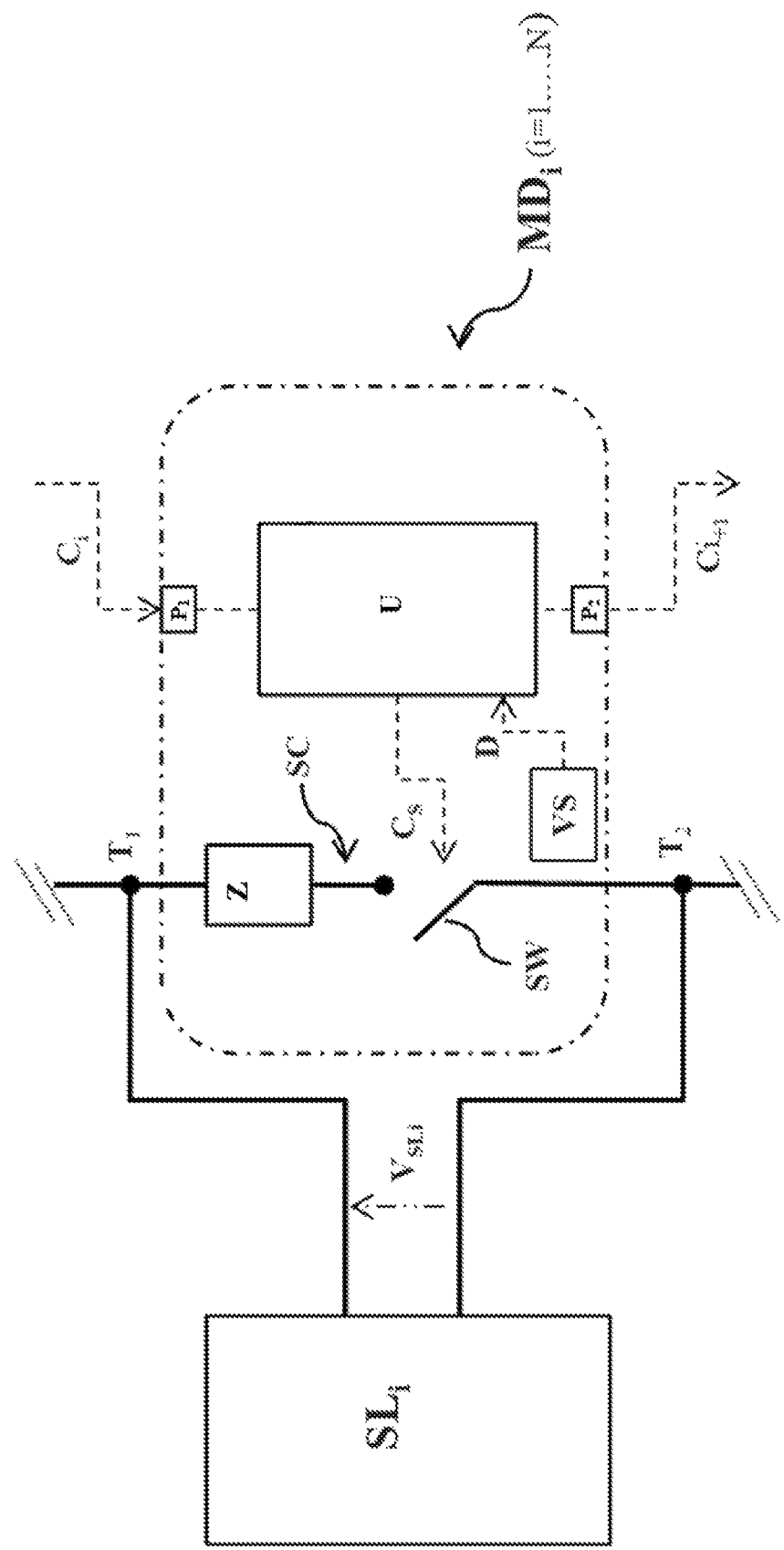

A generic control module $MD_i$ (i=1, ..., N) is shown in FIG. 4.

In the embodiments of FIGS. 2 and 2A, the control module $MD_i$ preferably comprises a controller U (e.g. a microcontroller) and a switching circuit SC controlled by said controller.

The controller U of the control module $MD_i$ is adapted to control the operation of a corresponding switching circuit SC.

Preferably, the switching circuit SC is electrically coupled in parallel with the power terminals $T_1$, $T_2$ of the photovoltaic panel $SL_i$ operatively associated with the control module $MD_i$.

Preferably, the switching circuit SC is configured to short-circuit the power terminals $T_1$, $T_2$ of the photovoltaic panel $SL_i$ in response to a trip signal Cs received from the controller U.

Preferably, the switching circuit SC comprises a switch SW, e.g. a MOSFET, a thyristor, an IGBT or a similar switching device.

The switch SW is electrically connected (in parallel) with the power terminals $T_1$, $T_2$ of the photovoltaic panel $SL_i$.

When it is in an interdiction (OFF) state, the switch SW prevents any current to flow through the switching circuit SC. Any current is thus forced to pass through the photovoltaic panel $SL_i$.

When it is in a conduction (ON) state, the switch SW short-circuits the power terminals $T_1$, $T_2$ of the photovoltaic panel $SL_i$. Any current is thus forced to pass through the switching circuit SC.

Preferably, the switching circuit SC comprises also an impedance Z (e.g. a resistance) electrically connected in series with the switch SW between the power terminals $T_1$, $T_2$ of the photovoltaic panel $SL_i$.

The impedance Z is adapted to limit the current passing through the switch SW when this latter short-circuits the power terminals $T_1$, $T_2$ of the photovoltaic panel $SL_i$.

Preferably, the controller U is adapted to provide the trip signal Cs for the switching circuit SC in response to a received input shut-down signal $C_i$ (i=1, ..., N).

More particularly, when an input shut-down signal $C_i$ (i=1, ..., N) is received, the controller U provides the trip signal Cs to command the switch SW to switch in a conduction state, thereby short-circuiting the power terminals $T_1$, $T_2$ of the photovoltaic panel $SL_i$ and causing the shut-down (de-energization) of this latter.

In the embodiment of FIG. 2, when the control module $MD_i$ coincides with the initial control module $MD_1$ or an intermediate control module $MD_i$ (i=2, ..., N−1), the controller U is adapted to provide an output shut-down signal $C_{i+1}$ (i=1, ..., N−1) in response to a received input shut-down signal $C_i$ (i=1, ..., N−1).

In the embodiment of FIG. 2A, when the control module $MD_i$ coincides with the initial control module $MD_1$ or an intermediate control module $MD_i$ (i=2, ..., N−1), the controller U may provide no output signals in response to a received input shut-down signal $C_i$ (i=1, ..., N−1).

In both the embodiments of FIGS. 2 and 2A, when the control module $MD_i$ coincides with the final control module $MD_N$, the controller U is adapted to provide the output control signal $C_{N+1}$ in response to a received input shut-down signal $C_N$.

In the embodiment of FIG. 2, the control module $MD_i$ comprises an input port $P_1$ and an output port $P_2$ operatively coupled with the controller U.

Preferably, when the control module $MD_i$ coincides with the initial control module $MD_1$, the input port $P_1$ is adapted to receive an input shut-down signal $C_1$ provided by the control arrangement 200 and transmit the input shut-down signal $C_1$ to the controller U.

Preferably, when the control module $MD_i$ (i=2, ..., N−1) coincides with an intermediate control module or with the final control module $MD_N$, the input port $P_1$ is adapted to receive an input shut-down signal $C_i$ (i=2, ..., N) provided by a preceding control module $MD_{i-1}$ (i=2, ..., N−1) and transmit said input shut-down signal to the controller U.

Preferably, when it coincides with the initial control module $MD_i$ or an intermediate control module $MD_i$ (i=2, ..., N−1), the output port $P_2$ is adapted to transmit an output shut-down signal $C_{i+1}$ (i=1, ..., N−1), provided by the controller U, to a subsequent control module.

Preferably, when it coincides with the final control module $MD_N$, the output port $P_2$ is adapted to transmit externally the output control signal $C_{N+1}$ provided by the controller U.

In the embodiment of FIG. 2A, the controller U of each control module $MD_i$ (i=1, ..., N) is adapted to receive an input shut-down signal $C_i$ (i=1, ..., N) from the control arrangement.

In this case, the control module $MD_i$ comprises at least the input port $P_1$ that is adapted to receive an input shut-down signal $C_i$ (i=1, ..., N) provided by the control arrangement 200 and transmit said input shut-down signal to the controller U.

In the embodiment of FIG. 2A, when it coincides with the initial control module $MD_1$ or an intermediate control module $MD_i$ (i=2, ..., N−1), the control module $MD_i$ may comprise no output ports.

However, when it coincides with the final control module $MD_N$, the control module $MD_i$ comprises an output port $P_2$ operatively coupled with the controller U and adapted to transmit externally an output control signal $C_{N+1}$ provided by the controller U.

In both the embodiments of FIGS. 2 and 2A, the control module $MD_i$ preferably comprises a voltage sensor VS configured to provide detection signals D indicative of a voltage $V_{SLi}$ between the power terminals $T_1$, $T_2$ of the corresponding photovoltaic panel $SL_i$. Conveniently, the detection signals D are received and processed by the controller U, e.g. for calculating the above mentioned time delay $T_d$ or for transmitting detection data indicative of the voltage $V_{SLi}$ to the control arrangement 200.

Referring to FIG. 3, the general operation of the shut-down apparatus 1 is schematically shown (reference is made to both the embodiments of FIGS. 2 and 2A).

Following the initial control module $MD_1$, each further control module $MD_i$ (i=2, ..., N) is activated by a corresponding input shut-down signal $C_i$ (i=2, ..., N) to shut-down the corresponding photovoltaic panel $SL_i$ (i=2, ..., N) with a time delay Td with respect to a preceding control module. The photovoltaic panels $SL_i$ (i=1, ..., N) of the string 100 are thus de-energized (preferably by short-circuiting them) at different subsequent shut-down instants separated by corresponding time delays and the string voltage $V_{ST}$ between the power terminals $S_1$, $S_2$ of the string 100 progressively decreases with subsequent small voltage steps (e.g. 30 V) during the de-energization phase.

This solution allows remarkably reducing possible in-rush currents circulating during the de-energization of the string 100 of photovoltaic panels since such in-rush currents are step-by-step ri-circulated through the photovoltaic panels not yet short-circuited by the corresponding control modules.

The input capacitance of the DC section 600, which is typically quite higher than the parasitic capacitances of the photovoltaic panels, is in fact progressively discharged at each de-energization step carried out by the shut-down apparatus 100.

When the initial photovoltaic panel $SL_1$ is shut-down by the initial control module $MD_1$, the above input capacitance is discharged by a discharging circuit, which is electrically connected in parallel with said input capacitance and includes the internal impedance Z of the initial control module $MD_1$ and the equivalent resistances of the remaining photovoltaic panels $SL_i$ (i=2, ..., N) electrically connected in series one to another. It is evidenced that the overall impedance of the above-mentioned discharging circuit is relatively high as said discharging circuit includes the N−1 equivalent resistances of N−1 still active photovoltaic panels.

When an intermediate photovoltaic panel $SL_i$ (i=2, ..., N−1) is shut-down by the corresponding intermediate control module $MD_i$ (i=2, ..., N−1), the above input capacitance is discharged by a discharging circuit including the internal impedances of the activated control modules $MD_r$ (r=1, 2, ..., i) and the equivalent resistances of the remaining active photovoltaic panels $SL_r$ (r=i+1, ..., N) electrically connected in series one to another. The overall impedance of the above-mentioned discharging circuit is now decreased as said discharging circuit only includes the N−i equivalent resistances of N−i still active photovoltaic panels.

When the final photovoltaic panel $SL_N$ is shut-down by the corresponding intermediate control module $MD_N$, the above input capacitance is discharged by a discharging circuit including the internal impedances of the activated control modules $MD_i$ (i=1, 2, ..., N) only. The overall impedance of the above-mentioned discharging circuit is now at a minimum value but is however suitable to discharge the above-mentioned input capacitance, as this latter has already dissipated most of the stored electric energy.

Thanks to above mentioned mechanism of progressive discharging of the input capacitance of the DC section 600, the internal impedances Z of the activated control modules $MD_i$ (i=1, 2, ..., N) can be designed to have relatively low values with relevant advantages in terms of costs, size and nominal dissipated power.

Figure 5:
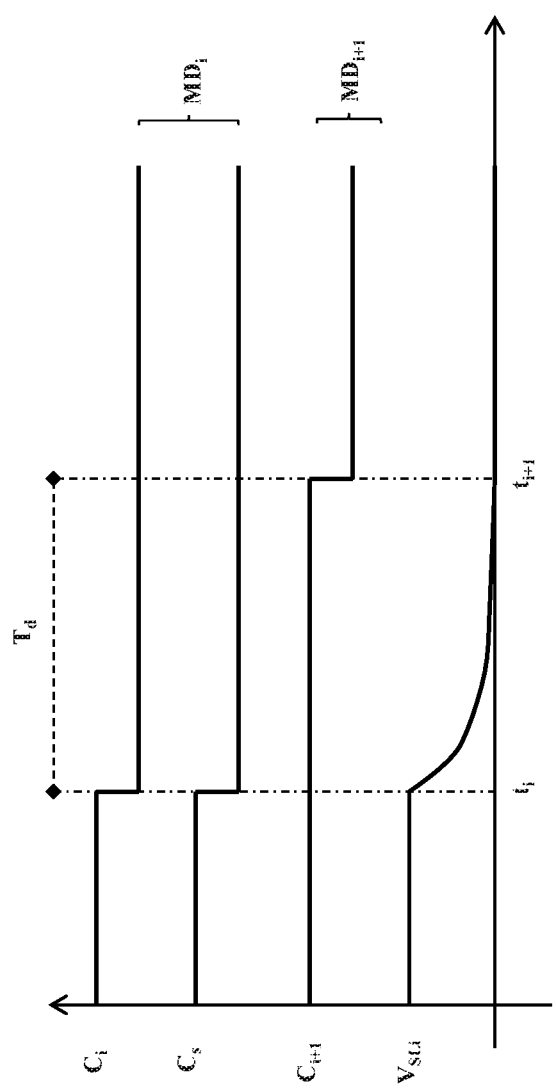

Referring to FIG. 5, the operation of a generic control module $MD_i$ (i=1, . . . , N) is schematically shown (reference is made to both the embodiments of FIGS. 2 and 2A).

Normally, the switch SW of the switching circuit SC is in an interdiction state.

In response to a received input shut-down signal $C_i$ (i=1, . . . , N) at a shut-down instant $t_i$, the controller U immediately provides the trip signal Cs for the switching circuit SC.

Upon receiving the trip signal Cs, the switch SW switches in a conduction state, thereby short-circuiting the power terminals $T_1$, $T_2$ of the photovoltaic panel $SL_i$.

The voltage $V_{LSi}$ between the power terminals $T_1$, $T_2$ of the photovoltaic panel $SL_i$ progressively decreases towards a null value with a time constant $\tau \approx RC$, where R, C are resistance and capacitance values respectively indicative of the equivalent resistance and capacitance seen from the power terminals $T_1$, $T_2$ of the photovoltaic panel $SL_i$.

Each pair of shut-down instants $t_i$, $t_{i+1}$, at which input shut-down signals Ci, $C_{i+1}$ are received by subsequent control modules $MD_i$, $MD_{i+1}$, is separated by a given time delay $T_d$.

Conveniently, the value of the time delay $T_d$ is selected in such a way that to allow a decrease of the voltage $V_{LSi}$ between the power terminals $T_1$, $T_2$ of the photovoltaic panel $SL_i$ close to a null value before the shut-down of a subsequent photovoltaic panel $SL_{i+1}$ is commanded. In this way, any photovoltaic panel of the string 100 is shut-down when the preceding photovoltaic panels have already been de-energized.

In principle, the time delay $T_d$ selected for each control module $MD_i$ may vary from one control module to another or be constant for all the control modules.

According to some embodiments of the invention, the value of the time delay $T_d$ is predefined and is conveniently stored in a memory location. In this case, the time delay $T_d$ may be stored by each control module $MD_i$, according to the embodiment of FIG. 2, or by the control arrangement 200, according to the embodiment of FIG. 2A.

According to some embodiments of the invention, the value of the time delay $T_d$ is run-time calculated depending on the behavior of the voltage $V_{LSi}$ between the power terminals $T_1$, $T_2$ of the photovoltaic panel $SL_i$. In this case, the time delay $T_d$ may be calculated by each control module $MD_i$ (embodiment of FIG. 2) or by the control arrangement 200 (embodiment of FIG. 2A).

Figure 6:
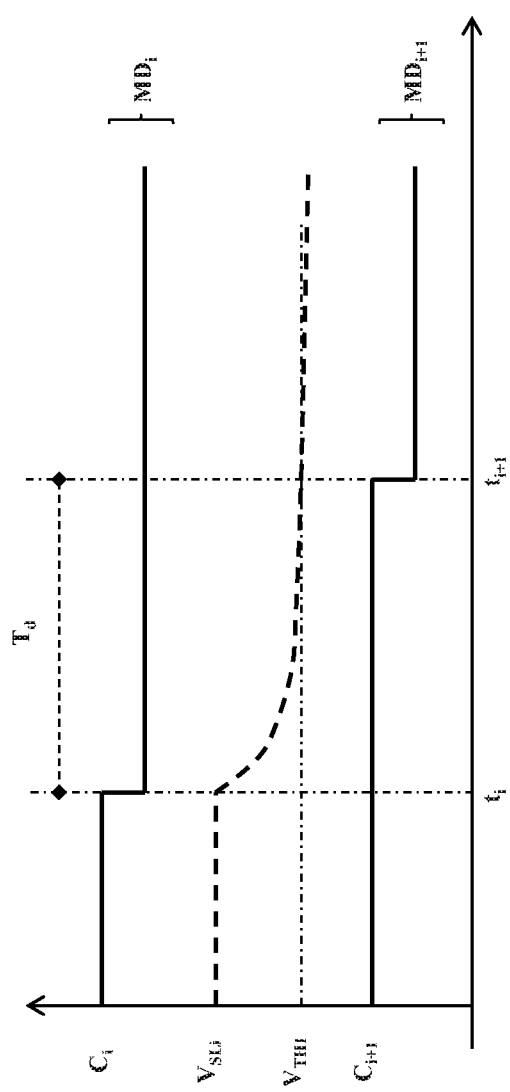

According to a possible calculation method (FIG. 6), the voltage $V_{LSi}$ is compared with a first voltage threshold value $V_{TH1}$ starting from the shut-down instant $t_i$ in which the input shut-down signal $C_i$ (i=1, . . . , N) is received and the power terminals $T_1$, $T_2$ of the photovoltaic panel $SL_i$ are short-circuited. The shut-down instant subsequent to the shut-down instant $t_i$, is calculated as the instant at which the voltage $V_{LSi}$ becomes lower than first voltage threshold value $V_{TH1}$.

The time delay $T_d$ is thus directly proportional to the time constant $\tau \approx RC$ with which the voltage $V_{LSi}$ between the power terminals $T_1$, $T_2$ of the photovoltaic panel $SL_i$ decreases upon the short-circuiting of said power terminals.

Figure 7:
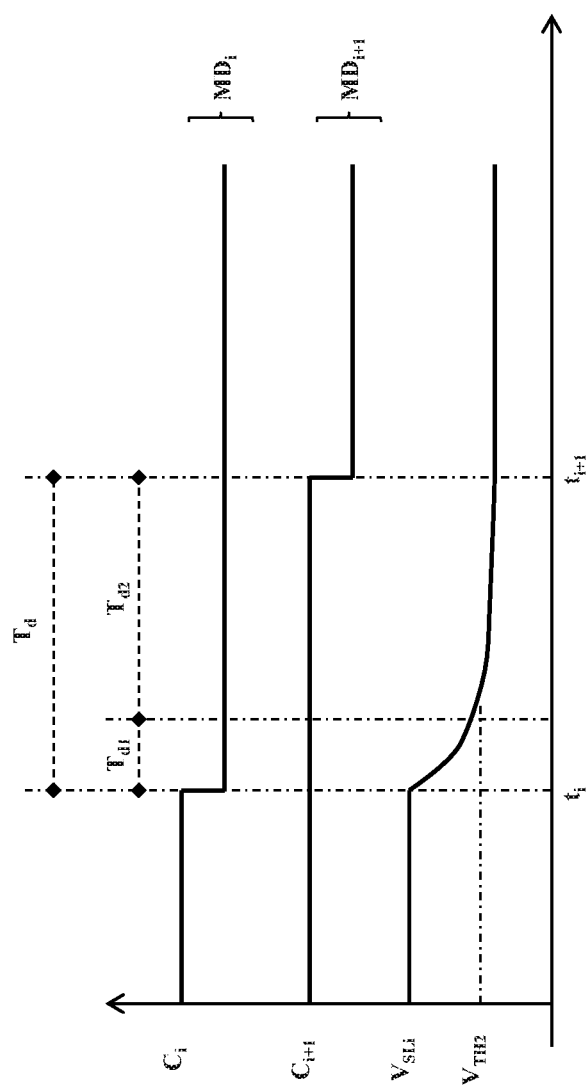

According to an alternative calculation method (FIG. 7), the time delay $T_d$ is calculated according to the following relation: $T_d = T_{d1} + T_{d2}$, where $T_{d1}$ is a time interval calculated by comparing the voltage $V_{LSi}$ with a second voltage threshold value $V_{TH2}$ (similarly to the calculation method illustrated above) and $T_{d2}$ is a predefined time interval stored in a memory location.

The shut-down instant $t_{i+1}$, subsequent to the shut-down instant $t_i$, is calculated as $t_{i+1} = t_{i+1}T_{d1} + T_{d2}$.

The shut-down apparatus, according to the invention, allows achieving the intended aims and objects.

The shut-down apparatus, according to the invention, allows effectively limiting the presence of in-rush currents during the de-energization of the string of photovoltaic panels.

As the photovoltaic panels are shut-down one-by-one by corresponding control modules, the shut-down apparatus, according to the invention, allows obtaining a full de-energization of the string of photovoltaic panels even if interruptions in the electrical connection between the photovoltaic panels are present for some reasons.

The shut-down apparatus, according to the invention, is characterized by low power consumption levels.

In normal conditions, the switching circuit SC of each control module is open, thus preventing any passage of current.

During the shut-down of the respective photovoltaic panel, in-rush currents may pass through the switching circuit of each photovoltaic module. However, the equivalent resistance shown by the switch in conduction state and by the impedance of said switching circuit is relatively low, which allows obtaining low electric power consumption levels.

The shut-down apparatus, according to the invention, can be easily manufactured at industrial level and it may be easily installed on the field at competitive costs with respect to the above-mentioned traditional solutions of the state of the art.

The invention claimed is:

1. A shut-down apparatus for a string of photovoltaic panels electrically connected in series comprising:
   a plurality of control modules including an initial control module, one or more intermediate control modules and a final control module operatively associated to corresponding photovoltaic panels, each control module being adapted to cause the shut-down of a corresponding photovoltaic panel in response to a received input shut-down signal, said control modules being adapted to sequentially receive said input shut-down signals at subsequent shut-down instants, each pair of subsequent shut-down instants being separated by a corresponding time delay, the time delay being at least in part based on a time to accommodate a decrease in a voltage between power terminals of the corresponding photovoltaic panel to about a null value before said input shut-down signal is commanded for said subsequent control module such that shut-down of the subsequent photovoltaic panel occurs after the preceding photovoltaic panels have been de-energized.

2. The shut-down apparatus, according to claim 1, wherein said plurality of control modules includes:
   said initial control module in communication with a control arrangement and with a subsequent control module, said initial control module being adapted to cause, in response to an input shut-down signal received from said control arrangement, the shut-down of a corresponding photovoltaic panel and provide an output shut-down signal for said subsequent control module, said output shut-down signal having a time delay with respect to the received input shut-down signal;
   each of said one or more intermediate control modules in communication with a preceding control module and with a subsequent control module, each intermediate control module being adapted to cause, in response to an input shut-down signal received from said preceding control module, the shut-down of a corresponding photovoltaic panel and provide an output shut-down signal for said subsequent control module, said output shut-down signal having a time delay with respect to the received input shut-down signal; and said final control module in communication with a preceding control module, said final control, module being adapted to cause, in response to an input shut-down signal received from said preceding control module, the shut-down of a corresponding photovoltaic panel.

3. The shut-down apparatus, according to claim 1, wherein said plurality of control modules includes:

said initial control module in communication with a control arrangement, said initial control module being adapted to cause, in response to an input shut-down signal received from said control arrangement, the shut-down of a corresponding photovoltaic panel;

each of said one or more intermediate control modules in communication with said control arrangement, each intermediate control module being adapted to cause, in response to an input shut-down signal received from said control arrangement, the shut-down of a corresponding photovoltaic panel;

said final control module in communication with said control arrangement, said final control module being adapted to cause, in response to an input shut-down signal received from said control arrangement, the shut-down of a corresponding photovoltaic panel; and said control modules being adapted to sequentially received said input shut-down signals from said control arrangement at subsequent shut-down instants separated by corresponding time delays.

4. The shut-down apparatus, according to claim 2, wherein said final control module is adapted to provide, in response to an input shut-down signal, an output control signal having a time delay with respect to the received input shut-down signal.

5. The shut-down apparatus, according to claim 4, wherein said final control module is in communication with a signalling module adapted to receive said output control signal from said final control module.

6. The shut-down apparatus, according to claim 1, wherein each control module comprises a controller and a switching circuit controllable by said controller and electrically coupled in parallel with power terminals of a corresponding photovoltaic panel, said switching circuit being adapted to short-circuit the power terminals of said corresponding photovoltaic panel in response to a trip signal received from said controller, said controller being adapted to provide said trip signal in response to a received input shut-down signal.

7. The shut-down apparatus, according to claim 6, wherein said switching circuit comprises a switch and an impedance electrically connected in series between the power terminals of said corresponding photovoltaic panel.

8. The shut-down apparatus, according to claim 6, wherein said controller is adapted to provide, in response to a received input shut-down signal, an output shut-down signal having a time delay with respect to the received input shut-down signal; and wherein said plurality of control modules includes:

said initial control module in communication with a control arrangement and with a subsequent control module, said initial, control module being adapted to cause, in response to an input shut-down signal received from said control arrangement, the shut-down of a corresponding photovoltaic panel and provide an output shut-down signal for said subsequent control module, said output shut-down signal having a time delay with respect to the received input, shut-down signal;

each of said one or more intermediate control modules in communication with a preceding control module and with a subsequent control module, each intermediate control module being adapted to cause, in response to an input shut-down signal received from said preceding control module, the shut-down of a corresponding photovoltaic panel and provide an output shut-down signal for said subsequent control module, said output shut-down signal having a time delay with respect to the received input shut-down signal; and said final control module in communication with a preceding control module, said final control module being adapted to cause, in response to an input shut-down signal received from said preceding control module, the shut-down of a corresponding photovoltaic panel.

9. The shut-down apparatus, according to claim 6, wherein each control module comprises a voltage sensor adapted to provide detection signals indicative of the voltage between power terminals of a corresponding photovoltaic panel.

10. The shut-down apparatus, according to claim 1, wherein each time delay is a predefined value.

11. The shut-down apparatus, according to claim 1, wherein each time delay is calculated depending, at least partially, on the voltage between power terminals of a corresponding photovoltaic panel during the shut-down of said corresponding photovoltaic, panel.

12. A control system for a photovoltaic plant, wherein it comprises a shut-down apparatus, according to claim 1.

13. The shut-down apparatus, according to claim 3, wherein said final control module is adapted to provide, in response to an input shut-down signal, an output control signal having a time delay with respect to the received input shut-down signal.

14. The shut-down apparatus, according to claim 13, wherein said final control module is in communication with a signalling module adapted to receive said output control signal from said final control module.

15. The shut-down apparatus, according to claim 7, wherein said controller is adapted to provide, in response to a received input shut-down signal, an output shut-down signal having a time delay with respect to the received input shut-down signal; and wherein said plurality of control modules includes:

said initial control module in communication with a control arrangement and with a subsequent control module, said initial control module being adapted to cause, in response to an input shut-down signal received from said control arrangement, the shut-down of a corresponding photovoltaic panel and provide an output shut-down signal for said subsequent control module, said output shut-down signal having a time delay with respect to the received input shut-down signal;

each of said one or more intermediate control modules in communication with a preceding control module and with a subsequent control module, each intermediate control module being adapted to cause, in response to an input shut-down signal received from said preceding control module, the shut-down of a corresponding photovoltaic panel and provide an output shut-down signal for said subsequent control module, said output shut-down signal having a time delay with respect to the received input shut-down signal; and said final control module in communication with a preceding control module, said final control module being adapted to cause, in response to an input shut-down signal received from said preceding control module, the shut-down of a corresponding photovoltaic panel.

16. The shut-down apparatus, according to claim 2, wherein each control module comprises a controller and a switching circuit controllable by said controller and electrically coupled in parallel with power terminals of a corresponding photovoltaic panel, said switching circuit being adapted to short-circuit the power terminals of said corresponding photovoltaic panel in response to a trip signal received from said, controller, said controller being adapted to provide said trip signal in response to a received input shut-down signal.

17. The shut-down apparatus, according to claim 3, wherein each control module comprises a controller and a switching circuit controllable by said controller and electrically coupled in parallel with power terminals of a corresponding photovoltaic panel, said switching circuit being adapted to short-circuit the power terminals of said corresponding photovoltaic panel in response to a trip signal received from said controller, said controller being adapted to provide said trip signal in response to a received input shut-down signal.

18. The shut-down apparatus, according to claim 4, wherein each control module comprises a controller and a switching circuit controllable by said controller and electrically coupled in parallel with power terminals of a corresponding photovoltaic panel, said switching circuit being adapted to short-circuit the power terminals of said corresponding photovoltaic panel in response to a trip signal received from said controller, said controller being adapted to provide said trip signal in response to a received input shut-down signal.

19. The shut-down apparatus, according to claim 7, wherein each control module comprises a voltage sensor adapted to provide detection signals indicative of the voltage between power terminals of a corresponding photovoltaic panel.

20. The shut-down apparatus, according to claim 8, wherein each control module comprises a voltage sensor adapted to provide detection signals indicative of the voltage between power terminals of a corresponding photovoltaic panel.

* * * * *